United States Patent [19]

Asami et al.

[11] Patent Number: 4,767,731
[45] Date of Patent: Aug. 30, 1988

[54] ALUMINUM TITANATE-MULLITE BASE CERAMICS

[75] Inventors: Seiichi Asami, Okazaki; Toshiyuki Hamanaka, Suzuka; Takashi Harada, Nagoya, all of Japan

[73] Assignee: NGK Insulators, Ltd., Japan

[21] Appl. No.: 886,365

[22] Filed: Jul. 17, 1986

[30] Foreign Application Priority Data

Jul. 22, 1985 [JP] Japan .................. 60-161712

[51] Int. Cl.$^4$ .......................... C04B 35/10
[52] U.S. Cl. ..................... 501/128; 501/134; 501/136; 501/153
[58] Field of Search ............... 501/128, 136, 153, 134

[56] References Cited

U.S. PATENT DOCUMENTS

| | | | |
|---|---|---|---|
| 4,307,198 | 12/1981 | Oda et al. ........................ | 501/136 |
| 4,316,965 | 2/1982 | Oda et al. ........................ | 501/128 |
| 4,384,046 | 5/1983 | Nakagami ........................ | 501/128 |
| 4,483,944 | 11/1984 | Day et al. ........................ | 501/128 |

Primary Examiner—William R. Dixon, Jr.
Assistant Examiner—Anthony Green
Attorney, Agent, or Firm—Parkhurst & Oliff

[57] ABSTRACT

A sintered aluminum titanate-mullite base ceramic having a chemical composition of not more than 0.8% of MgO, from 53 to 74% of $Al_2O_3$, from 14 to 33% of $TiO_2$, from 1.2 to 5% of $Fe_2O_3$, from 6 to 20% of $SiO_2$, and not more than 0.3% of ($CaO+Na_2O+K_2O$), and an amount of glass in mullite base matrices of the sintered body being not more than 5% when measured at a section of the sintered body. This aluminum titanate-mullite base ceramic is obtained by compounding from 40 to 65% of a starting material of aluminum titanate essentially consisting of from 45 to 62% of $Al_2O_3$, from 34 to 50% of $TiO_2$, from 3 to 7% of $Fe_2O_3$, not more than 1% of $SiO_2$ and not more than 0.3% of ($CaO+Na_2O+K_2O$) with from 35 to 60% of a starting material of mullite essentially consisting of from 18 to 32% of $SiO_2$, from 68 to 82% of $Al_2O_3$, and not more than 0.85% of ($Fe_2O_3+TiO_2+CaO+MgO+Na_2O+K_2O$), at least one of said aluminum titanate starting material and said mullite starting material being fired, and molding a resulting mixture, and firing a thus obtained molding at from 1,550° to 1,700° C. in an oxidizing atmosphere. The alumina titanate starting material may contain not more than 0.1% of MgO.

10 Claims, 3 Drawing Sheets

FIG.1

FIG_2

FIG_3

FIG_4

FIG_5

1

ALUMINUM TITANATE-MULLITE BASE CERAMICS

BACKGROUND OF THE INVENTION

1. Field of the Invention

The present invention relates to ceramic materials which are mainly composed, having a crystalline phase, of aluminum titanate and mullite and having high heat resistance, and excellent thermal shock resistance and thermal shock durability.

2. Related Art Statement

In industrial technology to solve new problems occurring with technological development, demands for high performance have not been attained with respect to the materials to be used for such industrial technology.

As to ceramic materials having excellent corrosion resistance, those further possessing heat resistance and thermal shock resistance having been called for. The thermal shock resistance of ceramics is influenced not only by characteristics such as the coefficient of thermal expansion, thermal conductivity, strength, modulus of elasticity, Poisson ratio, etc, of the material, but also by the size and the profile of a product made therefrom as well as heating and cooling states, that is, heat transfer speed. Among these characteristics influencing the thermal shock resistance, particularly the coefficient of thermal expansion has a large contributory factor. Particularly, when the heat transfer speed is large, it is known that the thermal shock resistance is greatly influenced only by the coefficient of thermal expansion. Thus, the development of materials having excellent thermal shock resistance as well as a low coefficient of thermal expansion has been strongly demanded. At the same time, it has also been desired that the heat resistance of the material be high.

On the other hand, the coefficient of thermal expansion of an aluminum titanate crystal, which constitutes the aluminum titanate ceramics, is largely different depending upon the crystal axes. When the thermal stress exceeds a limit of the strength of the constituting crystals or grain boundaries, microcracks are formed inside the grains or the grain boundaries. Consequently, the strength of the ceramic is decreased and it is likely to crack or break when used as a product. Therefore, development of materials having high strength and low coefficient of thermal expansion have been earnestly desired.

As the materials satisfying such a desire, there has been developed low expansion type ceramics mainly composed of magnesium oxide-aluminum oxide-titanium oxide-iron oxide-silicon oxide, as a crystalline phase (see U.S. Pat. No. 4,316,965 and European patent application laid-open No. 37,868).

Thereafter, there has been developed a material which contains aluminum titanate and mullite as a main crystalline phase and uses iron oxide and/or rare earth metal oxides as a sintering additive in such an amount as not to diminish the low coefficient of thermal expansion of aluminum titanate (European patent application laid-open No. 133,021 and U.S. Pat. No. 4,483,944).

The above-mentioned materials are excellent ceramic materials which possess high refractoriness and high thermal shock resistance as well as high mechanical strength and pay due consideration upon the stability of crystals of aluminum titanate under a continuously high temperature condition.

However, when a honeycomb structural type catalytic converter having a number of fine through holes as disclosed in the above publications is produced and used, the dimension gradually becomes larger than the original dimension due to an employed thermal cycling and will not restore to the original dimension. Further, such a converter is sooner or later fractured due to the dimensional growth. That is, the above materials have a problem in that are poor in durability when they undergo a thermal cycling.

Nevertheless, the conventional improvement of the aluminum titanate-mullite base material gives priority on the stability of the crystal of aluminum titanate under the continuously high temperature condition. Therefore, there still remains a problem that it is an extremely difficult technique to obtain a material which has refractoriness, heat resistance and thermal shock resistance as well as high mechanical strength and increased durability against the abovementioned thermal cycling.

SUMMARY OF THE INVENTION

It is an object of the present invention to provide a ceramic which solves the above difficult problem. Particularly, paying attention to the mullite base glass phase, the invention is aimed at making a glass phase in mullite base matrices as small as possible or completely removing it.

According to a first aspect of the present invention, there is a provision of a sintered aluminum titanate-mullite base ceramic having a chemical composition of not more than 0.8% of MgO, from 53 to 74% of $Al_2O_3$, from 14 to 33% of $TiO_2$, from 1.2 to 5% of $Fe_2O_3$, from 6 to 20% of $SiO_2$, and not more than 0.3% of ($CaO + Na_2O + K_2O$), and an amount of glass in mullite base matrices of the sintered ceramics being not more than 5% when measured at a cross section of the sintered body, said aluminum titanate-mullite base ceramic being obtained by compounding from 40 to 65% of a raw material of aluminum titanate essentially consisting of from 45 to 62% of $Al_2O_3$, from 34 to 50% of $TiO_2$, from 3 to 7% of $Fe_2O_3$, not more than 1% of $SiO_2$ and not more than 0.3% of ($CaO + Na_2O + K_2O$) with from 35 to 60% of a raw material of mullite essentially consisting of from 18 to 32% of $SiO_2$, from 68 to 82% of $Al_2O_3$, and not more than 0.8% of ($Fe_2O_3 + TiO_2 + CaO + MgO + Na_2O + K_2O$), at least one of said aluminum titanate starting material and said mullite starting material being fired, molding a resulting mixture, and firing a thus obtained molding at from 1,550° to 1,700° C. in an oxidizing atmosphere.

According to a second aspect of the present invention, there is a provision of a sintered aluminum titanate-mullite base ceramic having a chemical composition of not more than 0.8% of MgO from 53 to 74% of $Al_2O_3$, from 14 to 33% of $TiO_2$, from 1.2 to 5% of $Fe_2O_3$, from 6 to 20% of $SiO_2$, and not more than 0.3% of ($CaO + Na_2O + K_2O$), and an amount of glass in mullite base matrices of the sintered body being not more than 5% when measured at a cross section of the sintered body, said aluminum titanate-mullite base ceramic being obtained by compounding from 40 to 65% of a starting material of aluminum titanate essentially consisting of not more than 1% of MgO, from 45 to 62% of $Al_2O_3$, from 34 to 50% of $TiO_2$, from 3 to 7% of $Fe_2O_3$, not more than 1% of $SiO_2$ and not more than 0.3% of ($CaO + Na_2O + K_2O$) with from 35 to 60% of a starting material of mullite essentially consisting of from 18 to 32% of SiO$_2$, from 68 to 82% of Al$_2$O$_3$, and not more than 0.8% of (Fe$_2$O$_3$+TiO$_2$+CaO+MgO+Na$_2$O+K$_2$O) at least one of said aluminum titanate starting material and said mullite starting material being fired, molding a resulting mixture, and firing a thus obtained molding at from 1,550° to 1,700° C. in an oxidizing atmosphere.

According to a preferred embodiment of the present invention, the content of (Na$_2$O+K$_2$O) in the aluminum titanate starting material is not more than 0.15%.

According to another preferred embodiment of the present invention, the content of (Na$_2$O+K$_2$O) in the mullite starting material is not more than 0.25%.

According to still another preferred embodiment of the present invention, the average coefficient of thermal expansion at a temperature from 40° to 800° C. is from $-2.0 \times 10^{-6}$/°C. to $2.0 \times 10^{-6}$/°C.

According to a further preferred embodiment of the present invention, an increment in a linear dimension of the ceramics is not more than 1.0% after having been exposed forty times to a thermal cycling of a temperature rising from 40° C. to 1,260° C. in a time of 6 minutes and a cooling from 1,260° C. to 40° C. in a time of 5 minutes.

According to a still further preferred embodiment of the present invention, the maximum value of a difference between a value on a thermal expansion curve during temperature rising and that on a thermal expansion curve during cooling at an identical temperature is not more than 0.18%.

According to a still preferred embodiment of the present invention, the ceramic is designed as a honeycomb structural body.

The aluminum titanate-mullite base ceramic according to the present invention has refractoriness, heat resistance, thermal shock resistance and high mechanical strength as well as thermal shock durability.

These and other objects, features, and advantages of the present invention will be well appreciated upon reading of the following description of the invention when taken in connection with the attached drawings with understanding that some modifications, variations and changes of the same could be done by a skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein.

DETAILED DESCRIPTION OF THE INVENTION

The present invention will now explained in more detail with reference to the attached drawings.

Throughout the specification and claims of this application, "%" in the chemical composition means "%" by weight.

The amount of the glass in the mullite base matrices of the sintered body being not more than 5% is determined as follows:

In a photograph of a scanning electron microscope (SEM), with respect to a polished cross section of the sintered body, the area of mullite base matrices and the area of the glass phase are measured by using a planimeter, excluding the area of the pores and that of the aluminum titanate. The glass amount is represented by the following expression:

$$\text{Glass amount (\% at area)} = \frac{\text{area of glass phase (\%)}}{\text{area of mullite base matrices (\%)}} \times 100$$

According to an example of conventional materials, polygonal portions surrounded by the mullite crystals are present in the mullite base matrices. The analysis of chemical components in these portions revealed that they substantially have a composition of 68% of SiO$_2$, 24% of Al$_2$O$_3$, 4.4% of TiO$_2$, 1.0% of CaO and 2.0% of KNaO. This composition corresponds to a composition constituting the glass phase. In this application, these portions are called a "glass phase" in the mullite base matrices.

The present invention will be explained more concretely on the basis of the following examples and comparative examples. The examples are given merely in illustration of the invention and should not be interpreted to limit the scope thereof.

Examples and Comparative Examples are given in Tables 1 and 2. In these Tables, asterisk-prefixed numbers denote Comparative Examples, while AT and MU denote the aluminum titanate starting material and the mullite starting material, respectively.

TABLE 1(a)

| | Chemical composition (wt %) | | | | | | | | | Firing temperature of starting material (°C.) | | Mixing ratio AT/MU (wt %) |
|---|---|---|---|---|---|---|---|---|---|---|---|---|
| | AT | | | | | | MU | | | | | |
| Sample No. | MgO | Al$_2$O$_3$ | TiO$_2$ | Fe$_2$O$_3$ | SiO$_2$ | CaO + Na$_2$O + K$_2$O (Na$_2$O + K$_2$O) | SiO$_2$ | Al$_2$O$_3$ | Fe$_2$O$_3$ + TiO$_2$ + CaO + MgO + Na$_2$O + K$_2$O (Na$_2$O + K$_2$O) | AT | MU | |
| *1 | 0.5 | 50.7 | 43.6 | 4.8 | 0.2 | 0.16 (0.11) | 24.8 | 74.7 | 0.43 (0.21) | 1,600 | green | 35/65 |
| 2 | 0.5 | 50.7 | 43.6 | 4.8 | 0.2 | 0.16 (0.11) | 24.8 | 74.7 | 0.43 (0.21) | 1,600 | green | 40/60 |
| 3 | 0.5 | 50.7 | 43.6 | 4.8 | 0.2 | 0.16 (0.11) | 24.8 | 74.7 | 0.43 (0.21) | 1,600 | green | 50/50 |
| 4 | 0.5 | 50.7 | 43.6 | 4.8 | 0.2 | 0.16 (0.11) | 24.8 | 74.7 | 0.43 (0.21) | 1,600 | green | 65/35 |

TABLE 1(a)-continued

| Sample No. | \multicolumn{6}{c}{AT} | \multicolumn{4}{c}{MU} | Firing temperature of starting material (°C.) | | Mixing ratio AT/MU (wt %) |
|---|---|---|---|---|---|---|---|---|---|---|---|---|
| | MgO | $Al_2O_3$ | $TiO_2$ | $Fe_2O_3$ | $SiO_2$ | $CaO + Na_2O + K_2O$ ($Na_2O + K_2O$) | $SiO_2$ | $Al_2O_3$ | $Fe_2O_3 + TiO_2 + CaO + MgO + Na_2O + K_2O$ ($Na_2O + K_2O$) | AT | MU | |
| *5 | 0.5 | 50.7 | 43.6 | 4.8 | 0.2 | 0.16 (0.11) | 24.8 | 74.7 | 0.43 (0.21) | 1,600 | green | 70/30 |
| 6 | 0.0 | 53.9 | 41.7 | 3.9 | 0.3 | 0.14 (0.09) | 24.8 | 74.7 | 0.43 (0.21) | 1,600 | 1,600 | 50/50 |
| *7 | 0.0 | 53.8 | 41.7 | 3.9 | 0.3 | 0.25 (0.16) | 24.8 | 74.7 | 0.43 (0.21) | 1,600 | 1,600 | 50/50 |
| *8 | 0.0 | 53.7 | 41.6 | 3.9 | 0.4 | 0.33 (0.20) | 24.8 | 74.7 | 0.43 (0.21) | 1,600 | 1,600 | 50/50 |
| 9 | 0.5 | 53.1 | 41.8 | 4.0 | 0.4 | 0.14 (0.10) | 24.8 | 74.7 | 0.43 (0.21) | 1,600 | 1,600 | 50/50 |
| *10 | 0.5 | 53.0 | 41.8 | 4.0 | 0.4 | 0.26 (0.18) | 24.8 | 74.7 | 0.43 (0.21) | 1,600 | 1,600 | 50/50 |
| *11 | 0.5 | 52.9 | 41.7 | 4.0 | 0.5 | 0.34 (0.23) | 24.8 | 74.7 | 0.43 (0.21) | 1,600 | 1,600 | 50/50 |
| 12 | 1.0 | 52.4 | 42.2 | 4.0 | 0.2 | 0.15 (0.10) | 24.8 | 74.7 | 0.43 (0.21) | 1,600 | 1,600 | 50/50 |
| *13 | 1.5 | 51.6 | 42.4 | 4.0 | 0.3 | 0.15 (0.12) | 24.8 | 74.7 | 0.43 (0.21) | 1,550 | 1,600 | 50/50 |
| *14 | 0.5 | 43.2 | 51.9 | 4.0 | 0.2 | 0.16 (0.11) | 24.8 | 74.7 | 0.43 (0.21) | 1,600 | green | 50/50 |
| 15 | 0.5 | 45.0 | 50.0 | 4.0 | 0.3 | 0.17 (0.12) | 24.8 | 74.7 | 0.43 (0.21) | 1,600 | green | 50/50 |
| 16 | 0.5 | 62.0 | 34.0 | 3.0 | 0.3 | 0.17 (0.12) | 24.8 | 74.7 | 0.43 (0.21) | 1,600 | green | 50/50 |
| *17 | 0.5 | 63.5 | 32.4 | 3.0 | 0.3 | 0.17 (0.12) | 24.8 | 74.7 | 0.43 (0.21) | 1,600 | green | 50/50 |
| 18 | 0.5 | 52.0 | 39.9 | 7.0 | 0.3 | 0.23 (0.12) | 24.8 | 74.7 | 0.43 (0.21) | 1,600 | 1,600 | 50/50 |

TABLE 1(b)

| Sample No. | \multicolumn{6}{c}{Chemical composition of AT-MU green body} | Firing temperature (°C.) | Content of glass phase in matrices (%) | Coefficient of thermal expansion $\times 10^{-6}$/°C. (40-800° C.) | Thermal cyclic test (%) | Thermal expansion hysteresis test (%) |
|---|---|---|---|---|---|---|---|---|---|---|---|
| | MgO | $Al_2O_3$ | $TiO_2$ | $Fe_2O_3$ | $SiO_2$ | $CaO + Na_2O + K_2O$ | | | | | |
| *1 | 0.2 | 66.3 | 15.4 | 1.7 | 16.2 | 0.20 | 1,600 | <1 | 2.18 | 0.46 | — |
| 2 | 0.2 | 65.1 | 17.5 | 2.0 | 15.0 | 0.19 | 1,600 | <1 | 1.90 | 0.49 | — |
| 3 | 0.3 | 62.8 | 21.8 | 2.4 | 12.5 | 0.19 | 1,600 | <1 | 0.36 | 0.53 | 0.14 |
| 4 | 0.3 | 59.1 | 28.4 | 3.2 | 8.8 | 0.18 | 1,600 | 3 | −0.05 | 0.92 | 0.18 |
| *5 | 0.4 | 57.8 | 30.6 | 3.4 | 7.6 | 0.18 | 1,600 | 9 | −0.45 | 1.21 | 0.23 |
| 6 | 0.0 | 64.3 | 20.9 | 2.0 | 12.6 | 0.18 | 1,600 | <1 | 0.53 | 0.43 | 0.14 |
| *7 | 0.0 | 64.2 | 20.9 | 2.0 | 12.6 | 0.24 | 1,600 | 6 | 0.50 | 1.08 | — |
| *8 | 0.0 | 64.2 | 20.9 | 2.0 | 12.6 | 0.28 | 1,600 | 12 | 0.47 | 1.34 | 0.25 |
| 9 | 0.3 | 63.8 | 21.0 | 2.1 | 12.6 | 0.18 | 1,600 | <1 | 0.37 | 0.61 | 0.15 |
| *10 | 0.3 | 63.7 | 21.0 | 2.1 | 12.6 | 0.24 | 1,600 | 10 | 0.45 | 1.27 | — |
| *11 | 0.3 | 63.7 | 20.9 | 2.1 | 12.7 | 0.28 | 1,600 | 15 | 0.38 | 1.39 | 0.21 |
| 12 | 0.5 | 63.5 | 21.2 | 2.0 | 12.6 | 0.18 | 1,600 | 5 | 0.44 | 0.93 | — |
| *13 | 0.8 | 63.1 | 21.3 | 2.0 | 12.6 | 0.18 | 1,550 | 18 | 0.78 | 1.52 | 0.25 |
| *14 | 0.3 | 59.0 | 26.0 | 2.0 | 12.5 | 0.19 | 1,600 | 13 | 0.87 | 1.43 | — |
| 15 | 0.3 | 59.8 | 25.1 | 2.0 | 12.6 | 0.19 | 1,600 | 4 | 0.31 | 0.89 | — |
| 16 | 0.3 | 68.3 | 17.1 | 1.5 | 12.6 | 0.19 | 1,600 | <1 | 1.97 | 0.41 | — |
| *17 | 0.3 | 69.1 | 16.3 | 1.5 | 12.6 | 0.19 | 1,600 | <1 | 2.15 | 0.83 | — |
| 18 | 0.3 | 63.3 | 20.0 | 3.5 | 12.6 | 0.22 | 1,600 | 3 | 0.88 | 0.91 | — |

TABLE 1(c)

| Sample No. | \multicolumn{6}{c}{AT} | \multicolumn{3}{c}{MU} | Firing temperature of starting material (°C.) | | Mixing ratio AT/MU (wt %) |
|---|---|---|---|---|---|---|---|---|---|---|---|---|
| | MgO | $Al_2O_3$ | $TiO_2$ | $Fe_2O_3$ | $SiO_2$ | $CaO + Na_2O + K_2O$ ($Na_2O + K_2O$) | $SiO_2$ | $Al_2O_3$ | $Fe_2O_3 + TiO_2 + CaO + MgO + Na_2O + K_2O$ ($Na_2O + K_2O$) | AT | MU | |
| *19 | 0.5 | 51.5 | 39.4 | 8.0 | 0.3 | 0.22 (0.12) | 24.8 | 74.7 | 0.43 (0.21) | 1,600 | 1,600 | 50/50 |
| 20 | 0.5 | 53.1 | 41.1 | 4.0 | 1.0 | 0.23 (0.12) | 24.8 | 74.7 | 0.43 (0.21) | 1,600 | 1,600 | 50/50 |
| *21 | 0.5 | 52.9 | 40.8 | 4.0 | 1.5 | 0.23 (0.13) | 24.8 | 74.7 | 0.43 (0.21) | 1,600 | 1,600 | 50/50 |
| 22 | 0.5 | 50.7 | 43.6 | 4.8 | 0.2 | 0.16 (0.11) | 24.8 | 74.7 | 0.43 (0.21) | green | 1,600 | 50/50 |
| *35 | 0.5 | 50.7 | 43.6 | 4.8 | 0.2 | 0.16 (0.11) | 24.8 | 74.7 | 0.43 (0.21) | green | green | 50/50 |
| *23 | 0.5 | 50.7 | 43.6 | 4.8 | 0.2 | 0.16 (0.11) | 14.8 | 84.6 | 0.52 (0.20) | 1,600 | 1,600 | 50/50 |
| 24 | 0.5 | 50.7 | 43.6 | 4.8 | 0.2 | 0.16 (0.11) | 18.0 | 81.6 | 0.40 (0.18) | 1,600 | 1,600 | 50/50 |
| 25 | 0.5 | 50.7 | 43.6 | 4.8 | 0.2 | 0.16 (0.11) | 31.5 | 68.0 | 0.45 (0.20) | 1,600 | 1,600 | 50/50 |
| *26 | 0.5 | 50.7 | 43.6 | 4.8 | 0.2 | 0.16 (0.11) | 34.7 | 64.7 | 0.58 (0.21) | 1,600 | 1,600 | 50/50 |
| *27 | 0.5 | 50.7 | 43.6 | 4.8 | 0.2 | 0.16 (0.11) | 24.9 | 74.3 | 0.78 (0.29) | 1,600 | 1,600 | 50/50 |
| *28 | 0.5 | 50.7 | 43.6 | 4.8 | 0.2 | 0.16 (0.11) | 24.9 | 74.1 | 0.92 (0.34) | 1,600 | 1,600 | 50/50 |
| 36 | 1.0 | 52.3 | 42.2 | 4.0 | 0.3 | 0.15 (0.12) | 24.7 | 74.5 | 0.76 (0.24) | 1,600 | green | 65/35 |
| 37 | 0.5 | 61.0 | 35.0 | 3.0 | 0.3 | 0.17 (0.11) | 17.9 | 81.7 | 0.40 (0.18) | 1,600 | green | 40/60 |
| 38 | 0.5 | 45.0 | 50.0 | 4.0 | 0.3 | 0.17 (0.12) | 31.8 | 67.7 | 0.45 (0.20) | 1,600 | green | 65/35 |
| 39 | 0.5 | 52.0 | 39.9 | 7.0 | 0.3 | 0.23 (0.14) | 24.7 | 74.5 | 0.76 (0.23) | 1,600 | green | 65/35 |
| 40 | 0.5 | 53.1 | 41.1 | 4.0 | 1.0 | 0.23 (0.13) | 31.8 | 67.7 | 0.45 (0.20) | 1,600 | green | 40/60 |
| 41 | 0.5 | 50.7 | 43.6 | 4.8 | 0.2 | 0.16 (0.11) | 17.9 | 81.7 | 0.40 (0.18) | 1,600 | green | 65/35 |
| 42 | 0.5 | 50.6 | 43.6 | 4.8 | 0.2 | 0.28 (0.14) | 24.7 | 74.5 | 0.76 (0.24) | 1,600 | green | 50/50 |

TABLE 1(d)

| Sample No. | Chemical composition of AT-MU green body | | | | | | Firing temperature (°C.) | Results in evaluation tests | | | |
|---|---|---|---|---|---|---|---|---|---|---|---|
| | MgO | Al$_2$O$_3$ | TiO$_2$ | Fe$_2$O$_3$ | SiO$_2$ | CaO + Na$_2$O + K$_2$O | | Content of glass phase in matrices (%) | Coefficient of thermal expansion × 10$^{-6}$/°C. (40–800° C.) | Thermal cyclic test (%) | Thermal expansion hysteresis test (%) |
| *19 | 0.3 | 63.1 | 19.8 | 4.0 | 12.6 | 0.21 | 1,600 | 8 | 1.09 | 1.18 | — |
| 20 | 0.3 | 63.9 | 20.6 | 2.0 | 12.9 | 0.22 | 1,600 | 4 | 0.29 | 0.94 | — |
| *21 | 0.3 | 63.8 | 20.5 | 2.0 | 13.2 | 0.22 | 1,600 | 15 | −0.22 | 1.48 | — |
| 22 | 0.3 | 62.7 | 21.9 | 2.4 | 12.5 | 0.19 | 1,600 | <1 | 0.78 | 0.81 | — |
| *35 | 0.3 | 62.7 | 21.9 | 2.4 | 12.5 | 0.19 | 1,600 | 29 | 0.34 | 1.92 | — |
| *23 | 0.3 | 67.6 | 21.9 | 2.5 | 7.5 | 0.19 | 1,600 | <1 | 2.30 | 1.1 | — |
| 24 | 0.3 | 66.1 | 21.9 | 2.4 | 9.1 | 0.17 | 1,600 | <1 | 1.48 | 0.87 | — |
| 25 | 0.3 | 59.3 | 21.9 | 2.4 | 15.9 | 0.18 | 1,600 | 2 | 0.41 | 0.83 | — |
| *26 | 0.3 | 57.7 | 21.9 | 2.5 | 17.4 | 0.19 | 1,600 | 12 | −0.07 | 1.38 | — |
| *27 | 0.3 | 62.5 | 21.9 | 2.5 | 12.6 | 0.22 | 1,600 | 10 | 0.53 | 1.23 | — |
| *28 | 0.3 | 62.3 | 22.0 | 2.5 | 12.6 | 0.26 | 1,600 | 22 | 0.47 | 1.63 | — |
| 36 | 0.8 | 60.1 | 27.4 | 2.6 | 8.8 | 0.20 | 1,600 | 5 | 0.26 | 0.94 | — |
| 37 | 0.2 | 73.4 | 14.0 | 1.2 | 10.9 | 0.20 | 1,600 | <1 | 1.98 | 0.38 | — |
| 38 | 0.3 | 53.0 | 32.5 | 2.6 | 11.3 | 0.22 | 1,600 | 4 | 0.76 | 0.88 | — |
| 39 | 0.3 | 59.9 | 25.9 | 4.8 | 8.8 | 0.23 | 1,600 | 4 | 1.41 | 0.97 | — |
| 40 | 0.2 | 61.9 | 16.4 | 1.7 | 19.5 | 0.24 | 1,600 | 5 | −0.03 | 0.95 | — |
| 41 | 0.3 | 61.7 | 28.3 | 3.1 | 6.4 | 0.19 | 1,600 | <1 | 1.75 | 0.51 | — |
| 42 | 0.3 | 62.6 | 21.8 | 2.5 | 12.5 | 0.29 | 1,600 | 5 | 0.87 | 0.99 | — |

TABLE 2

| Sample No. | Firing temp. (°C.) | | | Results in evaluation | | | |
|---|---|---|---|---|---|---|---|
| | AT | MU | Green body | Content of glass phase in matrices (%) | Coefficient of thermal expansion × 10$^{-6}$/°C. (40–800° C.) | Thermal cyclic test (%) | Coefficient of thermal expansion after aging 1100° C. × 500 hrs × 10$^{-6}$(/°C.) |
| *29 | 1,500 | 1,500 | 1,500 | <1 | 2.65 | 1.20 | — |
| 30 | 1,550 | 1,550 | 1,550 | <1 | 1.73 | 0.98 | 1.90 |
| 31 | 1,700 | 1,700 | 1,700 | 2 | −1.98 | 0.79 | −1.80 |
| 32 | 1,650 | 1,650 | 1,600 | <1 | 0.01 | 0.32 | 0.13 |
| *33 | 1,600 | 1,600 | 1,650 | 8 | −1.20 | 1.20 | — |
| *34 | 1,600 | green | 1,650 | 17 | −0.95 | 1.48 | — |

In Table 1 and 2, "Thermal cyclic test (%)" means "dimensional growth in thermal cycling".

Figure 1:
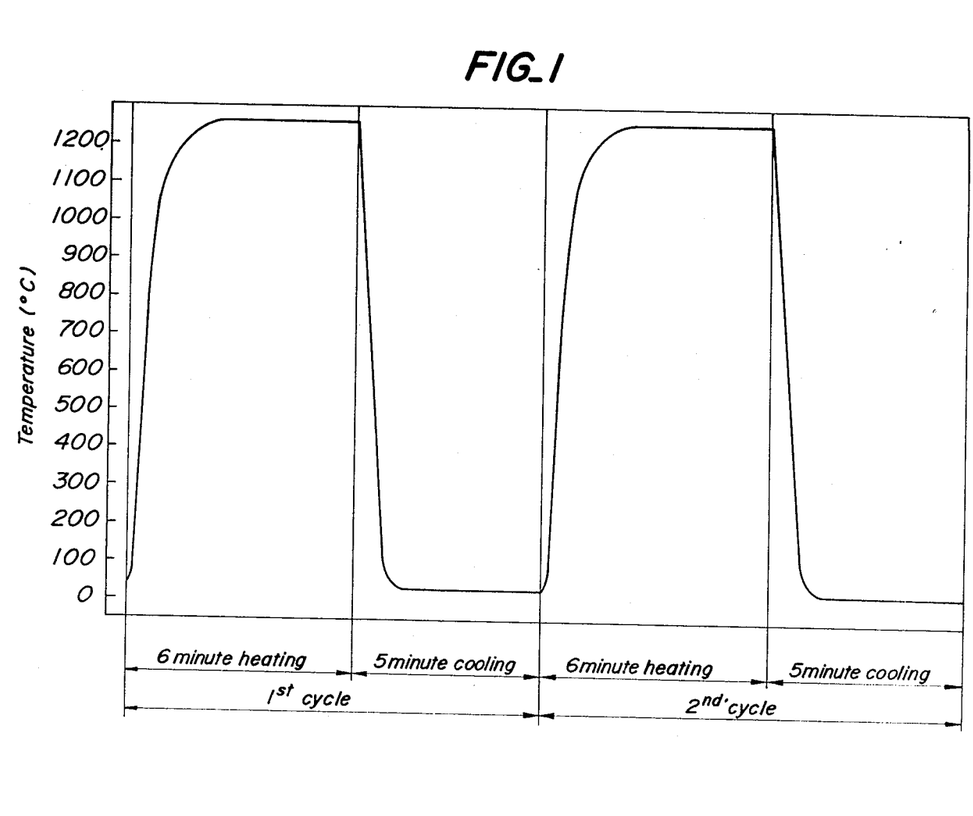
FIG. 1 is a diagram showing heat curves in a thermal cycling test.

A heat curve in a thermal cyclic test in which a sample to be tested is subjected forty times to a heat cycle consisting of a temperature rising from 40° C. to 1,260° C. in 6 minutes and a cooling from 1,260° C. to 40° C. in 5 minutes is by way of example as shown in FIG. 1. The size of the sample to be tested in the above is 1.27 cm in cube. The sizes of the samples are finely measured by using a super micrometer prior to and posterior to the testing.

It is known that the hysteresis in the thermal expansion indicates the presence of microcracks in the sintered body. The aluminum titanate ceramic also exhibits a large hysteresis loss in thermal expansion owing to the microcracks in the sintered body. The hysteresis loss in the thermal expansion which represents the state of the microcracks is closely correlated with the dimensional increase after the exposure to the thermal cycling. It has been experimentally, confirmed that there is a relation between them that when the difference in the thermal expansion between the respective thermal expansion curves during heating and cooling at an indentical temperature exceeds 0.18% at the identical temperature, the dimensional increase in the thermal cycling testing at 40 cycling times exceeds 1%.

Figure 2:
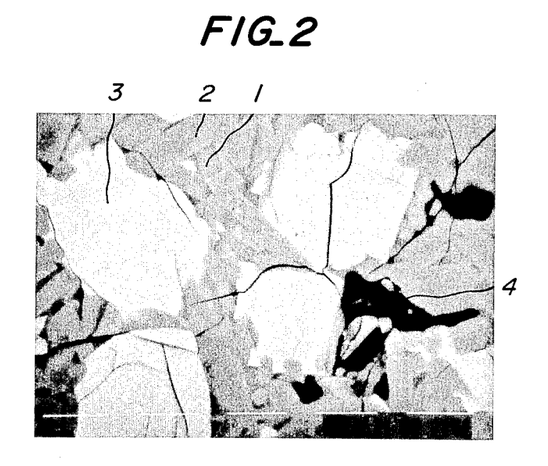
FIG. 2 is a 1,300 magnification SEM (scanning electron microscope) photograph showing microstructure of crystals of a fired product of a conventional material.
Figure 5:
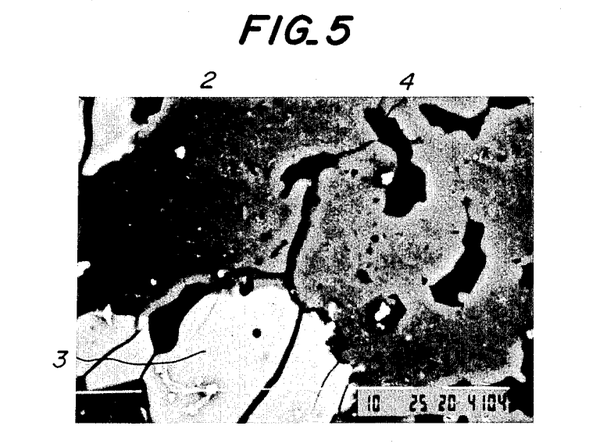
FIG. 5 is a 1,300 magnification SEM photograph showing the microstructure of crystals of the material in Example 3 according to the present invention which has undergone 250 times a thermal cycling between 1,260 and 40° C.

In FIGS. 2 and 5 are shown states of the glass phase in the mullite base matrices.

Figure 3:
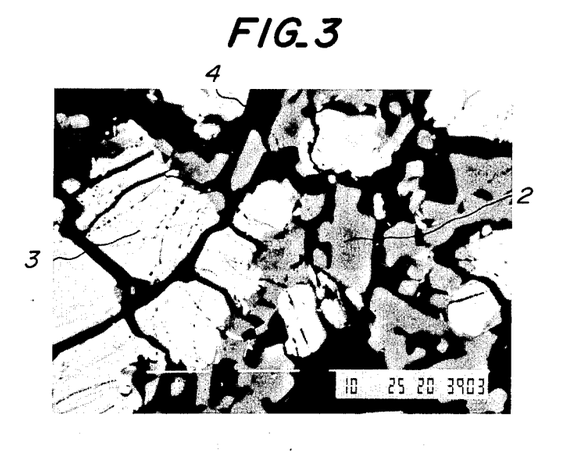
FIG. 3 is a 1,300 magnification SEM photograph of showing the microstructure of crystals of the above conventional material having undergone 250 times a thermal cycling between 1,260° C. and 40° C.
Figure 4:
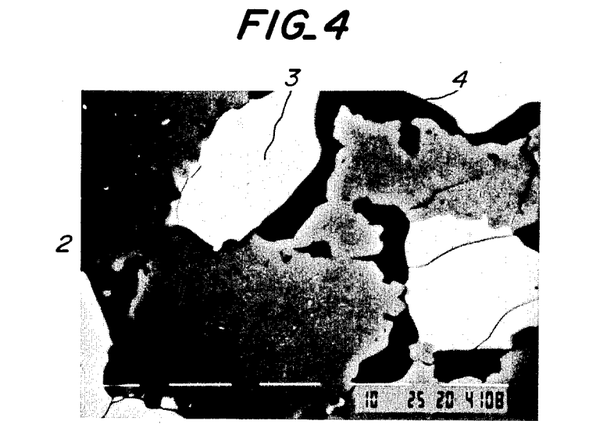
FIG. 4 is a 1,300 magnification SEM photograph showing the microstructure of a material of Example 3 according to the present invention as sintered.

FIG. 2 is a 1,300 magnification SEM photograph of a conventional material as fired in which a glass phase 1, mullite crystals 2, aluminum titanate 3 and pores 4 are seen. FIG. 3 is a 1,300 magnification SEM photograph of this conventional material which has undergone the below-mentioned thermal cycling between 1,260° C. and 40° C. at 250 times. In FIG. 3, no glass phase is observed in the mullite base matrices. FIG. 4 is a 1,300 magnification SEM photograph of a material of Example 3 according to the present invention as fired. No glass phase is observed in the mullite base matrices. FIG. 5 is a 1,300 magnification SEM photograph of the material of Example 3 according to the present invention having undergone the below-mentioned thermal cycling between 1,260° C. and 40° C. at 250 times. In FIG. 5, no change as in the conventional material is observed in the aluminum titanate crystals and the mullite base matrices even after the thermal cycling.

In the measurement of the coefficient of thermal expansion, a test piece having a length of 50 mm was used, which had been taken from an extruded honeycomb structural body having 80 passages per unit area of 1 square cm and the maximum thickness of partition walls being 150 um in length.

Ingredients compounded into the aluminum titanate raw materials used in Examples and Comparative Examples are purified rutile, low soda alumina, usual level soda alumina, iron oxide, and high purity magnesia. Ingredients compounded into the mullite starting materials are high purity kaolin, low soda alumina, high purity silica and high purity alumina.

The honeycomb structural bodies as mentioned above were used in evaluations of characteristics other than the above of Examples and Comparative Examples.

Examples 2 to 4 and Comparative Examples 1 and 5 are samples in which an aluminum titanate starting material was fired at 1,600° C. and a mullite starting material was compounded thereinto in green state, while the ratio in weight therebetween being varied at 35:65, 40:60, 50:50, 65:35, and 70:30. According to these samples, the coefficient of the thermal expansion is higher in Comparative Example 1. In Comparative Example 5, the glass phase in the mullite base matrices increased to make the dimensional change in the thermal cycling larger. Thus, the performances are deteriorated in both Comparative Examples. Therefore, it is understood that the quantitative relation between aluminum titanate and mullite must be that the aluminum titanate starting material is from 40 to 65% and the mullite raw material is from 35 to 60%.

Next, it is also understood from the comparison between Example 6 and Comparative Examples 7 and 8 that the content of $(Na_2O+K_2O)$ in the aluminum titanate starting material is required to be not more than 0.15%, since when an alkaline component in the auminum titanate increases, the glass phase in the mullite base matrices increases to make the dimensional change in the thermal cycling larger. Further to the comparison between Example 10 and Example 11, the reason for limiting the content of $(Na_2O+K_2O)$ is also understood.

The comparison among Examples 9 and 12 and Comparative Example 13 reveals that when the content of MgO exceeds 1.0%, the glass phase in the mullite base matrices increases to make the dimensional change in the thermal cycling larger, and therefore the content of MgO must be not more than 1%.

It is further understood from the comparison among Examples 15 and 16 and Comparative Examples 14 and 17 that when $Al_2O_3$ in the aluminum titanate and $TiO_2$ in aluminum titanate are less than 45% and more than 50%, respectively, the dimensional change due to the thermal cycling becomes larger, while when $Al_2O_3$ exceeds 62.0% and $TiO_2$ is less than 34%, the coefficient of thermal expansion becomes higher, thus both Comparative Examples deteriorating the characteristics.

It is understood from the comparison among Examples 18 and 20 and Comparative Examples 19 and 21 that when $Fe_2O_3$ exceeds 7.0% or $SiO_2$ exceeds 1% in aluminum titanate, the dimensional change in the heat cycle becomes larger to deteriorate the characteristics.

Next, from the comparison among Examples 24 and 25 and Comparative Examples 23, 26, 27 and 28, it is understood that when $Al_2O_3$ in the mullite starting material exceeds 82%, the content of corundum crystals entangling into the mullite base matrices becomes larger and the coefficient of thermal expansion becomes higher. But, the corundum crystals may be present in such a content of several percentages as not to influence the coefficient of thermal expansion.

When $Al_2O_3$ is less than 68%, the content of the glass phase in the mullite base matrices increases to make the dimensional change in the thermal cycling larger. On the other hand, if $SiO_2$ is less than 18%, the coefficient of thermal expansion becomes larger, while if $SiO_2$ exceeds 32%, the glass phase in the mullite base matrices increases to make the dimensional change during thermal cycling larger. In addition, if the content of $(Fe_2O_3+TiO_2+CaO+MgO+Na_2O+K_2O)$ exceeds 0.8%, particularly the content of $(Na_2O+K_2O)$ among them exceeds 0.25%, the glass phase in the mullite base matrices increases to make the dimensional change in thermal cycling larger.

Then, as shown in Table 2, Examples 3 and 22 and Comparative Example 35 in Table 1 and Examples 30, 31 and 32 and Comparative Examples 29, 33 and 34 in Table 2 in which the composition is the same as in Example 3 which the sintering temperature of the aluminum titanate starting material and the mullite starting material being varied are compared. From this, it is understood that when the firing temperature is less than 1,550°C., the coefficient of thermal expansion increases. If it exceeds 1,700° C., the deformation of the body in firing becomes larger. When the firing temperature of the aluminum titanate starting material or the mullite starting material is higher than that of the green body, the material transfer between aluminum titanate and mullite is restricted to enable the purity of the mullite phase to be maintained. Therefore, it is preferable that the firing temperature of the starting materials is higher than that of the sintered body. When neither the aluminum titanate starting material nor the mullite starting material is fired, as seen in Comparative Example 35, the content of the glass phase in the mullite base matrices increases to make the dimensional change during thermal cycling larger.

As having been detailed in the above, the aluminum titanate-mullite base ceramics according to the present invention is an excellent ceramic having a melting point of not less than 1,700° C. which is similar to that of the conventional ceramic materials, high refractoriness, high thermal shock resistance, and mechanical strength equal to or higher than that of the conventional ceramic materials. When the honeycomb type catalytic converter having numerous fine passages is produced from the ceramics according to the present invention and practically used, the dimension does not become larger than the original one even after thermal cycling at numerous repetition times. Further, since the extension of the microcracks is restricted, the ceramics according to the present invention will not be broken under thermal cycling. The ceramic according to the present invention has a more stable crystalline phase and excellent thermal shock resistance than conventional ceramics including the are earth additives, even though a test piece is maintained for a long time period at 1,100° to 1,200° C. at which aluminum titanate is most likely to be thermally decomposed. Thus, the present invention has overcome the extremely difficult technical problem in obtaining the ceramic material which has fire resistance, heat resistance, thermal shock resistance, and high mechanical strength as well as the thermal shock durability. Moreover, the ceramic according to the present invention can be widely used for automobile ceramic parts such as manifold-mounted honeycomb catalyst carrier, port liner, heat exchanger and kiln furniture which are required to have high thermal shock resistance and thermal shock durability at high temperatures as well as other thermally resistive and thermal shock resistive ceramic parts. In addition, it can be widely used as gas turbine parts, solar energy receiving heat resistive ceramic materials, refractories, ceramic materials such as porcelain in chemical industries which are required to have heat resistance, thermal shock resistance, thermal shock durability, wear resistance, corrosion resistance, etc. For this reason, the present invention will largely contribute to the development of these industries.

What is claimed is:

1. A sintered aluminum titanate-mullite base ceramic consisting essentially of:
   a chemical composition of not greater than 0.8% of MgO, 53 to 74% of $Al_2O_3$, 14 to 33% of $TiO_2$, 1.2 to 5% of $Fe_2O_3$, 6 to 20% of $SiO_2$, and ($CaO+Na_2O+K_2O$) in an amount not greater than 0.3%, and an amount of glass in mullite base matrices of the sintered ceramic being not greater than 5% when measured at a section of a body of said sintered ceramic;
   said sintered aluminum titanate-mullite base ceramic being formed by compounding 40 to 65% of a raw material of aluminum titanate consisting essentially of 45 to 62% of $Al_2O_3$, 34 to 50% of $TiO_2$, 3 to 7% of $Fe_2O_3$, not greater than 1% of $SiO_2$ and ($CaO+Na_1O+K_2O$) in an amount not greater than 0.3%, with 35 to 60% of a raw material of mullite consisting essentially of 18 to 32% of $SiO_2$, 68 to 82% of $Al_2O_3$, and ($Fe_2O_3+TiO_2+CaO+MgO+Na_2O+K_2O$) in an amount not greater than 0.8%, at least one of said aluminum titanate raw material and said mullite raw material being preliminarily fired at a temperature which is not less than 1550° C., molding a resulting mixture of the raw materials, and subsequently firing a thus obtained molding at 1,550° to 1,700° C. in an oxidizing atmosphere resulting in a sintered aluminum titanate-mullite base ceramic article;
   said article having an average coefficient of thermal expansion at a temperature range of 40° to 800° C. of $-2.0 \times 10^{-6}/°C$. to $2.0 \times 10^{-6}/°C$.;
   said article having an increment in a linear dimension which is not greater than 1.0% after said article has been exposed forty times to a thermal cycling at a temperature rising from 40° C. to 1,260° C. in a time of 6 minutes and cooling from 1,260° C. to 40° C. in a time of 5 minutes; and
   said article having a maximum difference value between a value on a thermal expansion curve during heating and a value on a thermal expansion curve during cooling at an identical temperature which is not greater than 0.18%.

2. A sintered aluminum titanate-mullite base ceramic consisting essentially of:
   a chemical composition of not greater than 0.8% of MgO, 53 to 74% of $Al_2O_3$, 14 to 33% of $TiO_2$, 1.2 to 5% of $Fe_2O_3$, 6 to 20% of $SiO_2$, and ($CaO+Na_2O+K_2O$) in an amount not greater than 0.3%, and an amount of glass in mullite base matrices of the sintered ceramic being not greater than 5% when measured at a section of a body of said sintered ceramic;
   said sintered aluminum titanate-mullite base ceramic being formed by compounding 40 to 65% of a raw material of aluminum titanate consisting essentially of not greater than 1% of MgO, 45 to 62% of $Al_2O_3$, 34 to 50% of $TiO_2$, 3 to 7% of $Fe_2O_3$, not greater than 1% of $SiO_2$ and ($CaO+Na_2O+K_2O$) in an amount not greater than 0.3%, with 35 to 60% of a raw material of mullite consisting essentially of 18 to 32% of $SiO_2$, 68 to 82% of $Al_2O_3$, and ($Fe_2O_3+TiO_2+CaO+MgO+Na_2O+K_2O$) in an amount not greater than 0.85%, at least one of said aluminum titanate raw material and said mullite raw material being preliminarily fired at a temperature which is not less than 1550° C., molding a resulting mixture of the raw materials, and firing a thus obtained molding at 1,550° to 1,700° C. in an oxidizing atmosphere resulting in a sintered aluminum titanate-mullite base ceramic article.
   said article having an average coefficient of thermal expansion at a temperature range of 40° to 800° C. of $-2.0 \times 10^{-6}/°C$. to $2.0 \times 10^{-6}/°C$.;
   said article having an increment in a linear dimension which is not greater than 1.0% after said article has been exposed forty times to a thermal cycling at a temperature rising from 40° C. to 1,260° C. in a time of 6 minutes and cooling from 1,260° C. to 40° C. in a time of 5 minutes; and
   said article having a maximum difference value between a value on a thermal expansion curve during heating and a value on a thermal expansion curve during cooling at an identical temperature, which is not greater than 0.18%.

3. A sintered aluminum titanate-mullite base ceramic according to claim 1, wherein the content of ($Na_2O+K_2O$) in the aluminum titanate raw material is not greater than 0.15%.

4. A sintered aluminum titanate-mullite base ceramic according to claim 1, wherein the content of ($Na_2O+K_2O$) in the mullite starting material is not greater than 0.25%.

5. A sintered aluminum titanate-mullite base ceramic according to claim 2, wherein the content of ($Na_2O+K_2O$) in the aluminum titanate starting material is not greater than 0.15%.

6. A sintered aluminum titanate-mullite base ceramic according to claim 2, wherein the content of ($Na_2O+K_2O$) in the mullite material starting is not greater than 0.25%.

7. A sintered aluminum titanate-mullite base ceramic according to claim 1, wherein the ceramic is designed as a honeycomb structural body.

8. A sintered aluminum titanate-mullite base ceramic according to claim 2, wherein the ceramic is designed as a honeycomb structural body.

9. A sintered aluminum titanate-mullite base ceramic consisting essentially of:
   a chemical composition of not greater than 0.8% of MgO, 53 to 74% of $Al_2O_3$, 14 to 33% of $TiO_2$, 1.2 to 5% of $Fe_2O_3$, 6 to 20% of $SiO_2$, and ($CaO+Na_2O+K_2O$) in an amount not greater than 0.3%, and an amount of glass in mullite base matrices of the sintered ceramic being not greater than 5% when measured at a section of a body of said sintered ceramic;
   said sintered aluminum titanate-mullite base ceramic being formed by compounding 40 to 65% of a raw material of aluminum titanate consisting essentially of 45 to 62% of $Al_2O_3$, 34 to 50% of $TiO_2$, 3 to 7% of $Fe_2O_3$, not greater than 1% of $SiO_2$ and ($CaO+Na_2O+K_2O$) in an amount not greater than 0.3%, with 35 to 60% of a raw material of mullite consisting essentially of 18 to 32% of $SiO_2$, 68 to 82% of $Al_2O_3$, and ($Fe_2O_3+TiO_2+CaO+MgO+Na_2O+K_2O$) in an amount not greater than 0.8%, at least one of said aluminum titanate raw material and said mullite raw material being preliminarily fired at a temperature which is not less than 1550° C., molding a resulting mixture of the raw materials, and subsequently firing a thus obtained molding at 1,550° to 1,700° C. in an oxidizing atmosphere resulting in a sintered aluminum titanate-mullite base ceramic article.

10. A sintered aluminum titanate-mullite base ceramic consisting essentially of:

a chemical composition of not greater than 0.8% of MgO, 53 to 74% of $Al_2O_3$, 14 to 33% of $TiO_2$, 1.2 to 5% of $Fe_2O_3$, 6 to 20% of $SiO_2$, and ($CaO + Na_2O + K_2O$) in an amount not greater than 0.3%, and an amount of glass in mullite base matrices of the sintered ceramic being not greater than 5% when measured at a section of a body of said sintered ceramic.

* * * * *